(12) United States Patent
Yang

(10) Patent No.: US 7,889,934 B2
(45) Date of Patent: Feb. 15, 2011

(54) IMAGE PROCESSING APPARATUS AND PROCESSING METHOD THEREOF

(75) Inventor: Shun-Pin Yang, Chang-Hua (TW)

(73) Assignee: Mediatek Inc., Hsin-Chu (TW)

( * ) Notice: Subject to any disclaimer, the term of this patent is extended or adjusted under 35 U.S.C. 154(b) by 1493 days.

(21) Appl. No.: 11/272,963

(22) Filed: Nov. 14, 2005

(65) Prior Publication Data

US 2007/0110323 A1 May 17, 2007

(51) Int. Cl.
*G06K 9/36* (2006.01)
*H04N 11/02* (2006.01)

(52) U.S. Cl. ................... 382/232; 382/236; 375/240.01

(58) Field of Classification Search ................. 382/232, 382/236; 375/240.01, 240.12; 348/384.1, 348/409.1
See application file for complete search history.

(56) References Cited

U.S. PATENT DOCUMENTS 7,110,025 B1 * 9/2006 Loui et al. ............... 348/220.1

2004/0218059 A1 * 11/2004 Obrador et al. .......... 348/220.1
2005/0207487 A1 * 9/2005 Monroe ................. 375/240.01

FOREIGN PATENT DOCUMENTS

JP 200496354 3/2004

OTHER PUBLICATIONS

CN Office Action mailed Sep. 19, 2008.
Partial English Translation of JP 200496354 Paragraphs [0008]-[0009], [0018-]-[0022], [0024], [0034], [0057], [0059], [0064], [0070], [0071] and Figs. 1 and 6.

* cited by examiner

*Primary Examiner*—Jon Chang
(74) *Attorney, Agent, or Firm*—Thomas, Kayden, Horstemeyer & Risley

(57) ABSTRACT

An image processing apparatus and method are provided. The apparatus comprises an image input device, an external memory, and an encoder. The image input device captures pictures, and the external memory stores the captured pictures. The encoder further comprises a moving picture compression unit, a still picture compression unit, and a recording unit. The moving picture compression unit and the still picture compression unit share the external memory and work simultaneously when at least one of the captured pictures is to be stored in both video and still image format. The recording unit records the compressed pictures.

6 Claims, 7 Drawing Sheets

IMAGE PROCESSING APPARATUS AND PROCESSING METHOD THEREOF

BACKGROUND

The invention relates to an image processing apparatus and method, and more particularly, to an image processing apparatus with hardware sharing for MPEG and JPEG encoding.

The Moving Picture Experts Group (MPEG) technology utilizes encoded Joint Photographic Experts Group (JPEG) images displayed in sequence in an arranged order to generate a motion effect. MPEG-1/2/4 standards relate to video and audio, encoding and decoding technologies, applied to digital camcorders, recorders, players, etc. JPEG standards encompass still image encoding and decoding technologies. JPEG is a general file format for digital cameras. Encoding technologies of MPEG and JPEG standards are further described in the following.

JPEG includes two classes of encoding and decoding processes, comprising a lossy process, which is DCT-based and is sufficient for many applications, and a lossless process, which is prediction-based. Further, JPEG includes four modes of operation, comprising a sequential DCT-based mode, a progressive DCT-based mode, a lossless mode, and a hierarchical mode.

With respect to sequential DCT-based mode, an image is first partitioned into blocks of 8×8 pixels, and the blocks are processed from left to right and top to bottom. Additionally, 8×8 2-D forward Discrete Cosine Transform (DCT) is applied to each block. 8×8 DCT coefficients are quantized and the quantized DCT coefficients are encoded and output.

With respect to progressive DCT-based mode, similar to sequential DCT-based mode, quantized DCT coefficients, however, are first stored in a buffer. DCT coefficients in the buffer are then encoded by a multiple scanning process. In each scan, quantized DCT coefficients are partially encoded by either spectral selection or successive approximation. In spectral selection, quantized DCT coefficients are divided into multiple spectral bands according to a zigzag order. Further, in each scan, a specified band is encoded. In successive approximation, a specified number of the most significant bits (MSB) of quantized coefficients are first encoded. In subsequent scans, less significant bits (LSB) are encoded.

With respect to lossless coding mode, Differential Pulse Code Modulation (DPCM) coding is implemented in a spatial domain. With respect to hierarchical mode, an image is first spatially down-sampled to a multiple layer pyramid. This sequence of hierarchical frames is encoded by predictive coding. Except for the first frame, the encoding process is applied to the differential frames. Hierarchical coding mode provides a progressive presentation similar to progressive DCT-based mode but is useful in applications that have multiple resolution requirements. Hierarchical mode also enables progressive coding to a final lossless stage.

A video stream is a sequence of video frames. Each frame is a still image. A video player displays one frame after another, usually at a rate close to 30 frames per second. Frames are divided into 16×16 pixel Macro Blocks (MB). Each MB consists of four 8×8 luminance blocks and two 8×8 chrominance blocks (1 U and 1 V). MBs are the units for motion-compensated compression. Blocks are used for DCT compression.

Video data complying with MPEG format files is composed of three different types of frames, comprising intra-frames (I-frames), forward predicted frames (P-frames), and bidirectional predicted frames (B-frames). An I-frame is encoded as a single image, with no reference to any past or future frame, referring to the fact that various lossless and lossy compression techniques are performed relative to information that is contained only within the current frame, and not relative to any other frame in the video sequence. In other words, no temporal processing is performed outside of the current frame. A P-frame is encoded relative to a closest preceding reference frame. A reference frame is a P- or I-frame. Each MB in a P-frame can be encoded as either an Intra or Inter MB. An Intra MB is encoded just like a MB in an I-frame, which is encoded with no reference frame. A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For MBs that use both past and future reference frames, the two 16×16 areas are averaged.

As described, MPEG and JPEG pictures have different resolution and file formats, encoding and decoding pictures with different processing methods, and traditionally use separate memory buffers for encoding and decoding. The JPEG encoder normally encodes pictures with higher resolution than that encoded by the MPEG encoder and performs some picture processing other than those for the MPEG encoder, such as resolution change or special color mode.

SUMMARY

An image processing apparatus is provided. An embodiment of such an apparatus comprises an image input device, an external memory, and an encoder. The image input device captures moving or still pictures. The external memory stores the moving and still pictures. The encoder further comprises a moving picture compression unit, a still picture compression unit, and a recording unit. When the image input device captures moving pictures, the moving picture compression unit compresses the moving pictures. When the image input device captures still pictures, the still picture compression unit compresses the still pictures. When the image input device captures moving and still pictures simultaneously, the encoder is capable of compressing the moving and still pictures at the same time. The recording unit records the compressed pictures.

An image processing method is provided. In an embodiment, pictures are captured and stored in an external memory. When moving pictures are captured, the moving pictures are compressed by a moving picture compression unit. When still pictures are captured, the still pictures are compressed by a still picture compression unit. When both moving and still pictures are captured, the moving and still pictures are compressed simultaneously by the moving and still picture compression units. The compressed pictures can thus be recorded.

BRIEF DESCRIPTION OF THE DRAWINGS

The invention can be more fully understood by reading the subsequent detailed description and examples of embodiments thereof with reference made to the accompanying drawings, wherein.

DETAILED DESCRIPTION

Figure 1:
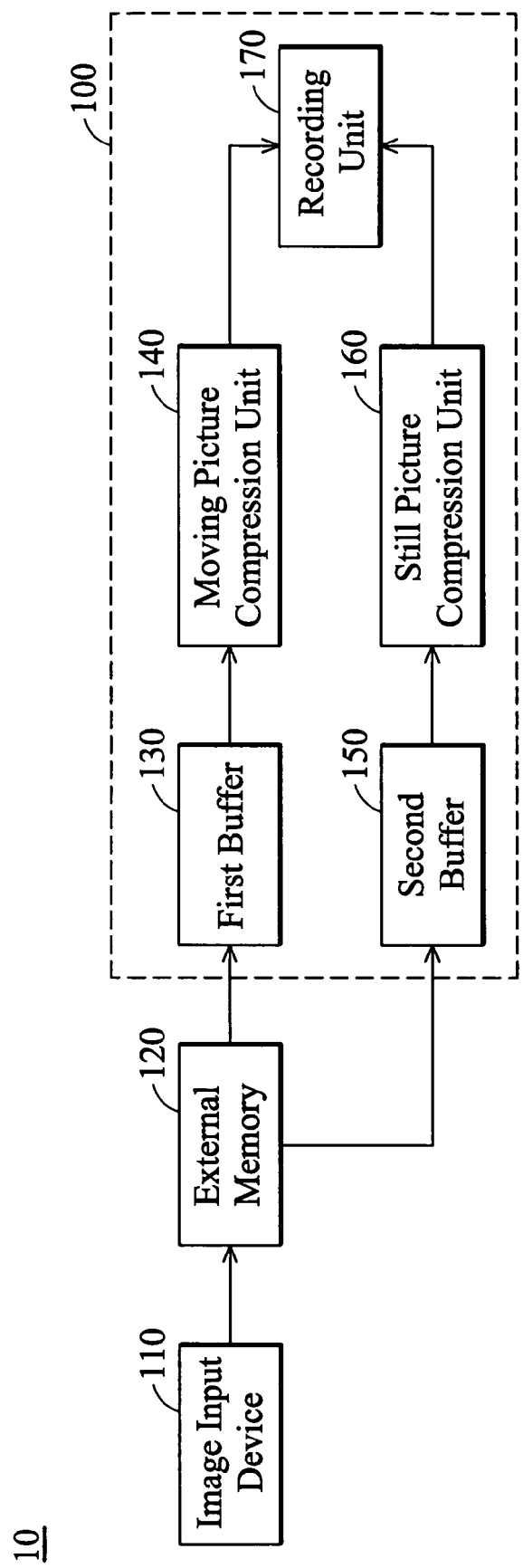
FIG. 1 is a schematic view of an embodiment of an image processing apparatus capable of performing MPEG and JPEG encoding with shared hardware.

Several exemplary embodiments of the invention are described with reference to FIGS. 1 through 7, which generally relate to encoding MPEG and JPEG pictures. It is to be understood that the following disclosure provides many embodiments with various components and arrangements as examples. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic view of an embodiment of an image processing apparatus with hardware sharing for MPEG and JPEG encoding.

An image processing apparatus 10 comprises an encoder 100, an image input device 110, and an external memory 120. In some embodiments, external memory 120 is a frame buffer for storing one or more frames. External memory may be a separable memory such as a Dynamic Random Access Memory (DRAM), or an embedded memory. Please note that the term "external" should not be interpreted as a limitation to the location of the memory. Encoder 100 further comprises a first buffer (called a block buffer) 130, a moving picture compression unit 140, a second buffer (called a block buffer) 150, a still picture compression unit 160, and a recording unit 170. When image input device (such as a digital device comprising videotaping and photo shooting functions, or an interface such as a cable receiving data for encoding) 110 obtains pictures, the pictures are stored in external memory 120. When image input device 110 obtains pictures for videotaping purpose, the pictures are transmitted to first buffer 130 via external memory 120. Next, moving picture compression unit 140 retrieves the moving pictures from first buffer 130 for picture compression, and recording unit 170 records the compressed moving pictures. When image input device 110 obtains pictures for photo shooting purpose, the pictures are transmitted to second buffer 150 via external memory 120. Still picture compression unit 160 then retrieves the pictures from second buffer 150 for picture compression, and recording unit 170 records the compressed still pictures. Recording unit 170 may store the compressed pictures in an optical disc such as DVD, hard disc, external plugged memory card, or any memory unit. First buffer 130 or second buffer 150 stores one or multiple 8×8 pixel blocks retrieved from external memory 120. Moving picture compression unit 140 and still picture compression unit 160 may be activated independently. When both the units are activated, both buffers 130 and 150 retrieve data from external memory 120 for corresponding compression units 140 and 160.

Figure 2:
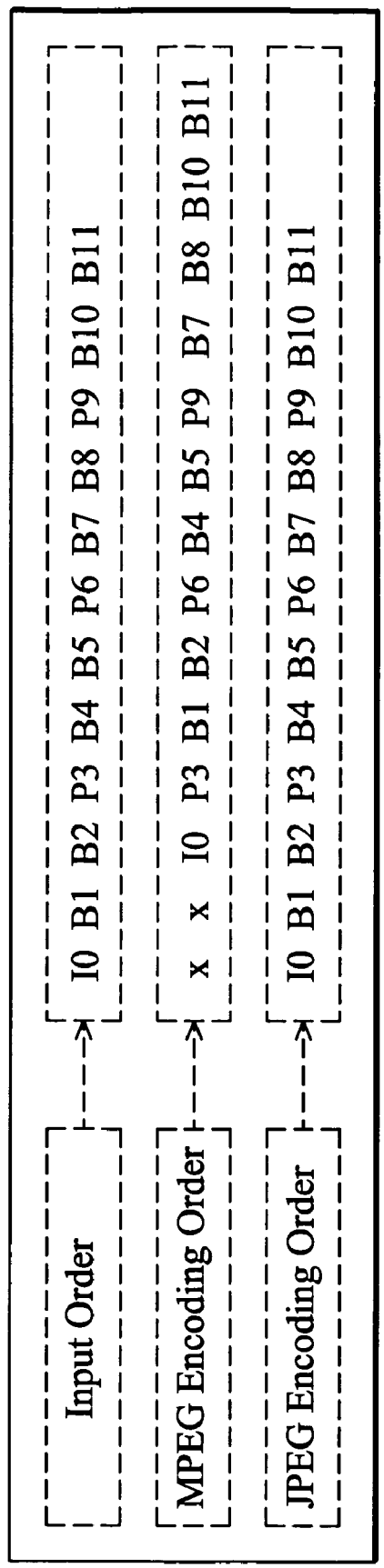
FIG. 2 is a schematic view of exemplary input and output orders for moving and still pictures from FIG. 1.

First buffer 130 may access frame spaces of external memory 120 in a different order with respect to second buffer 150 when activating both videotaping and photo shooting functions. As shown in FIG. 2, with respect to moving picture compression unit 140, while the input order and GOP (Group of Pictures) structure for moving picture compression is "I0 B1 B2 P3 B4 B5 P6 B7 B8 P9 B10 B11 . . . ", the MPEG encoding order is "x x I0 P3 B1 B2 P6 B4 B5 P9 B7 B8 . . . ", where two frames (pictures) delay is induced during MPEG encoding since a P-frame needs to be compressed before two preceding B-frames in this embodiment. With respect to still picture compression unit 160, output order for still picture compression can be "I0 B1 B2 P3 B4 B5 P6 B7 B8 P9 B10 B11 . . . ", which is same as the input order. It is noted that still picture compression unit 160 does not necessarily compress every picture but only demonstrates the order.

Figure 3:
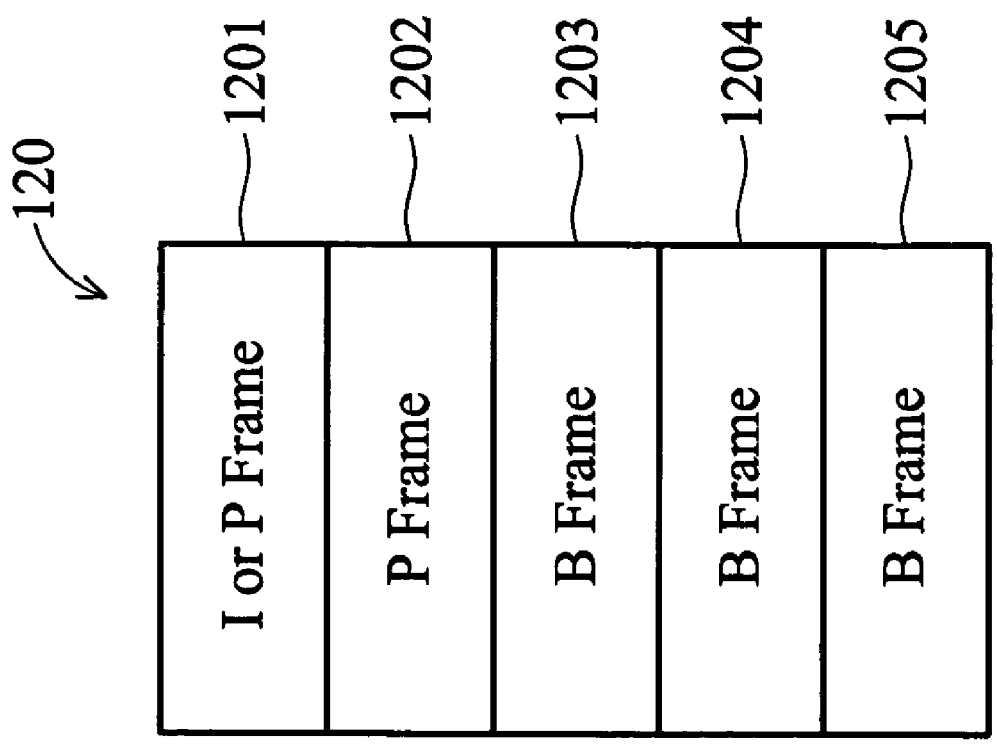
FIG. 3 is a schematic view of an exemplary frame buffer.

FIG. 3 shows an embodiment of external memory 120 as shown in FIG. 1, external memory 120 comprises five frame spaces for frame allocation. As shown in FIG. 3, I0-frame (or a subsequent P-frame) is first stored in frame space 1201. B1 and B2-frames must reference to I0-frame and P3-frame, such that P3-frame is stored in frame space 1202, so that P3-frame is MPEG compressed before these B-frames. Next, B1 and B2-frames are stored in frame space 1203 and 1204 respectively. Still picture compression unit 160 can directly share external memory 120 with memory allocation especially for moving picture compression.

Figure 4:
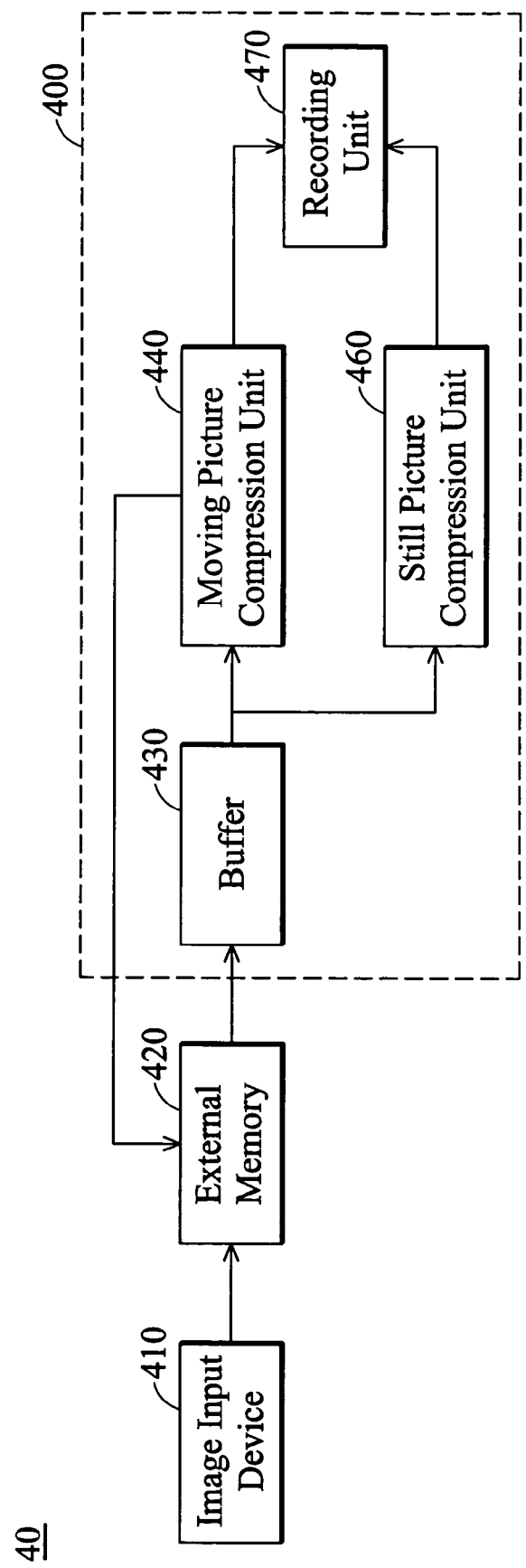
FIG. 4 is a schematic view of another embodiment of an image processing apparatus capable of performing MPEG and JPEG encoding with shared hardware.

FIG. 4 is a schematic view of another embodiment of an image processing apparatus with hardware sharing for processing both MPEG and JPEG encoding. An image processing apparatus 40 comprises an encoder 400, an image input device 410, and an external memory 420. Encoder 400 further comprises a buffer 430, a moving picture compression unit 440, a still picture compression unit 460, and a recording unit 470. When image input device 410 obtains pictures, the pictures are stored in external memory 420 and transmitted to buffer 430. When the pictures is compressed as video format, moving picture compression unit 440 retrieves the pictures from buffer 430, and recording unit 470 records the compressed moving pictures. Further, when the pictures is compressed as photo format, still picture compression unit 460 retrieves at least one picture from buffer 430, and recording unit 470 records the compressed still pictures.

Figure 5:
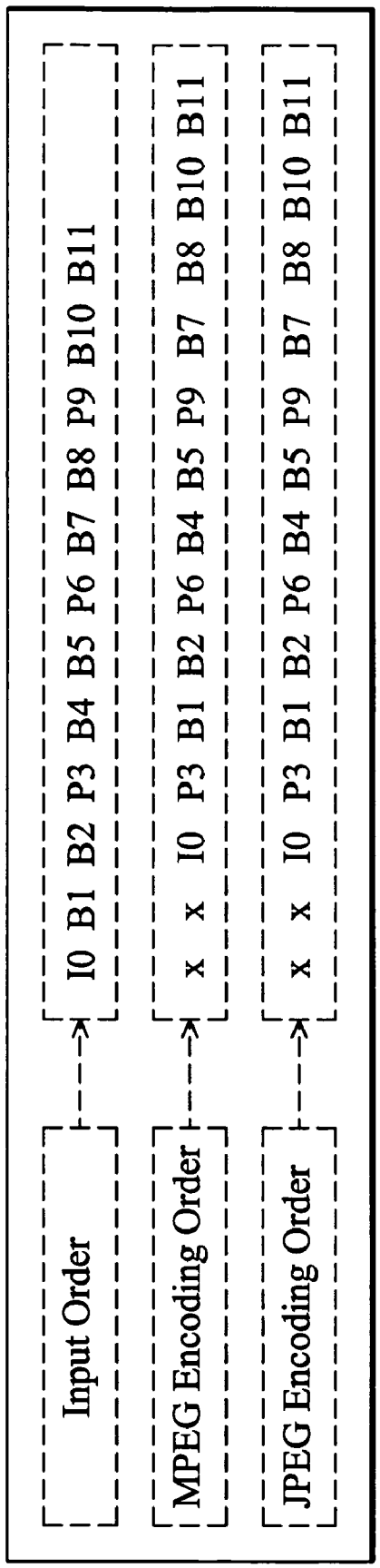
FIG. 5 is a schematic view of exemplary input and output orders for moving and still pictures from FIG. 4.

As shown in FIG. 5, the input order and the MPEG encoding order are the same as FIG. 2. Since both external memory 420 and buffer 430 as shown in FIG. 4 are shared between two compression units 440 and 460, the JPEG encoding order becomes "x x I0 P3 B1 B2 P6 B4 B5 P9 B7 B8 . . . " to comply with the MPEG encoding order. In some embodiments, the firmware of the image processing apparatus manages the processing order to allow the shared hardware working properly for both MPEG and JPEG encoding.

In this embodiment, the encoding order of the moving pictures is identical to that of the still pictures, in which a P-frame has time disorder. When image input device 410 continuously obtains pictures to be compressed in still pictures, recording unit 470 should rearrange the picture order, such that no time confusion happens. Similarly, still picture compression unit 160 does not necessarily compress every picture but only demonstrates the order.

Figure 6:
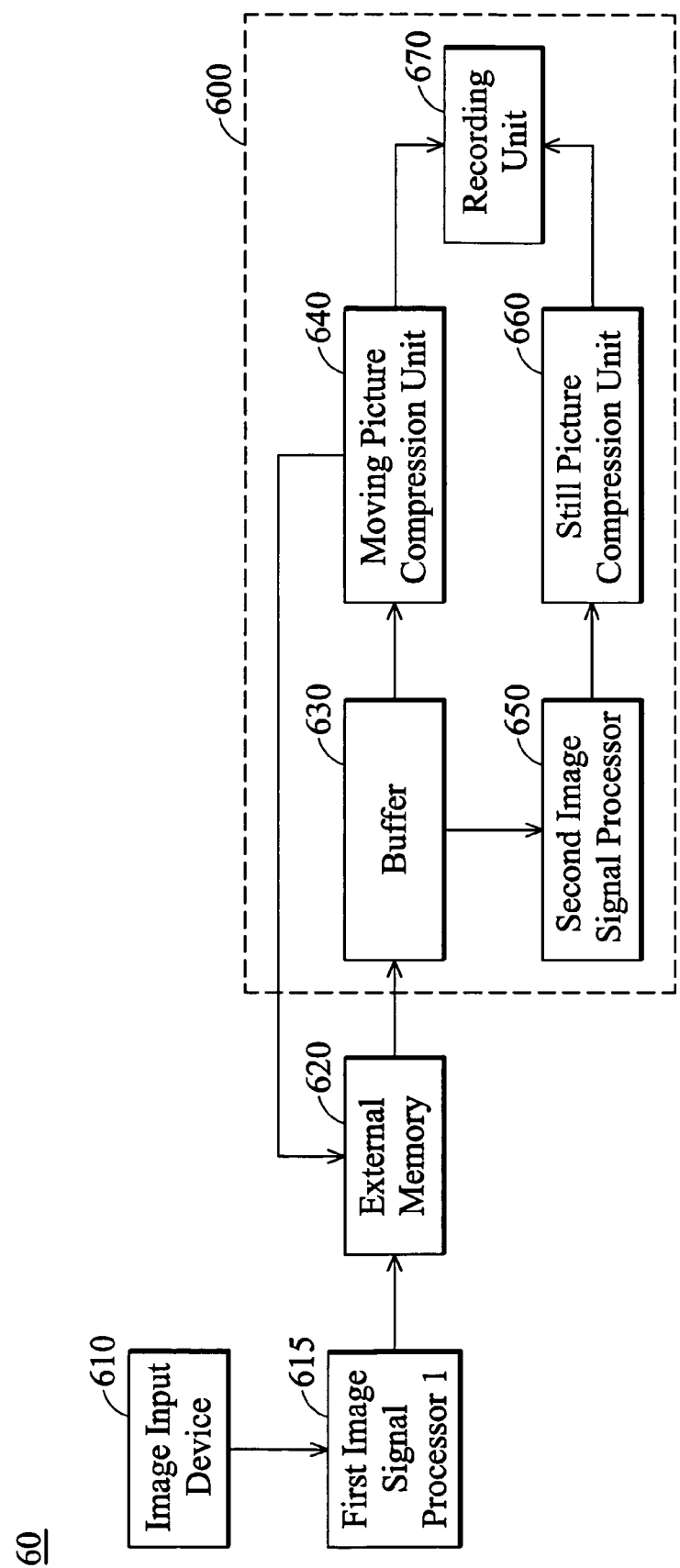
FIG. 6 is a schematic view of another embodiment of an image processing apparatus capable of performing MPEG and JPEG encoding with shared hardware.

FIG. 6 is a schematic view of another embodiment of an image processing apparatus with hardware sharing for MPEG and JPEG encoding.

An image processing apparatus 60 comprises an encoder 600, an image input device 610, a first image signal processor 615, and an external memory 620. Encoder 600 further comprises a buffer 630, a moving picture compression unit 640, a second image signal processor 650, a still picture compression unit 660, and a recording unit 670. In this embodiment, still pictures may be processed to include special effects. First image signal processor 615 may apply scaling, noise reduction, red eye reduction, color transformation, white balance, sharpness, and the like to captured pictures. Second image signal processor 650 may apply special photo effect, such as sepia, black or white, frame insertion, and the like to still pictures.

When image input device 610 obtains pictures, first image signal processor 615 may apply some special effects as described to the pictures, and the pictures are stored in external memory 620. The pictures are then transmitted to buffer 630. When image input device 610 obtains pictures for moving picture compression, moving picture compression unit 640 retrieves the moving pictures from buffer 630, and recording unit 670 records the compressed moving pictures. Further, when image input device 610 obtains pictures for still picture compression, second image signal processor 650 may apply a special photo effect as described to the still pictures, still picture compression unit 660 retrieves the still pictures from second image signal processor 650, and recording unit 670 records the compressed still pictures.

In this embodiment, the encoding order of still pictures is identical to that of moving pictures, as shown in FIG. 5 because buffer 630 is shared between the two compression units 640 and 660.

Figure 7:
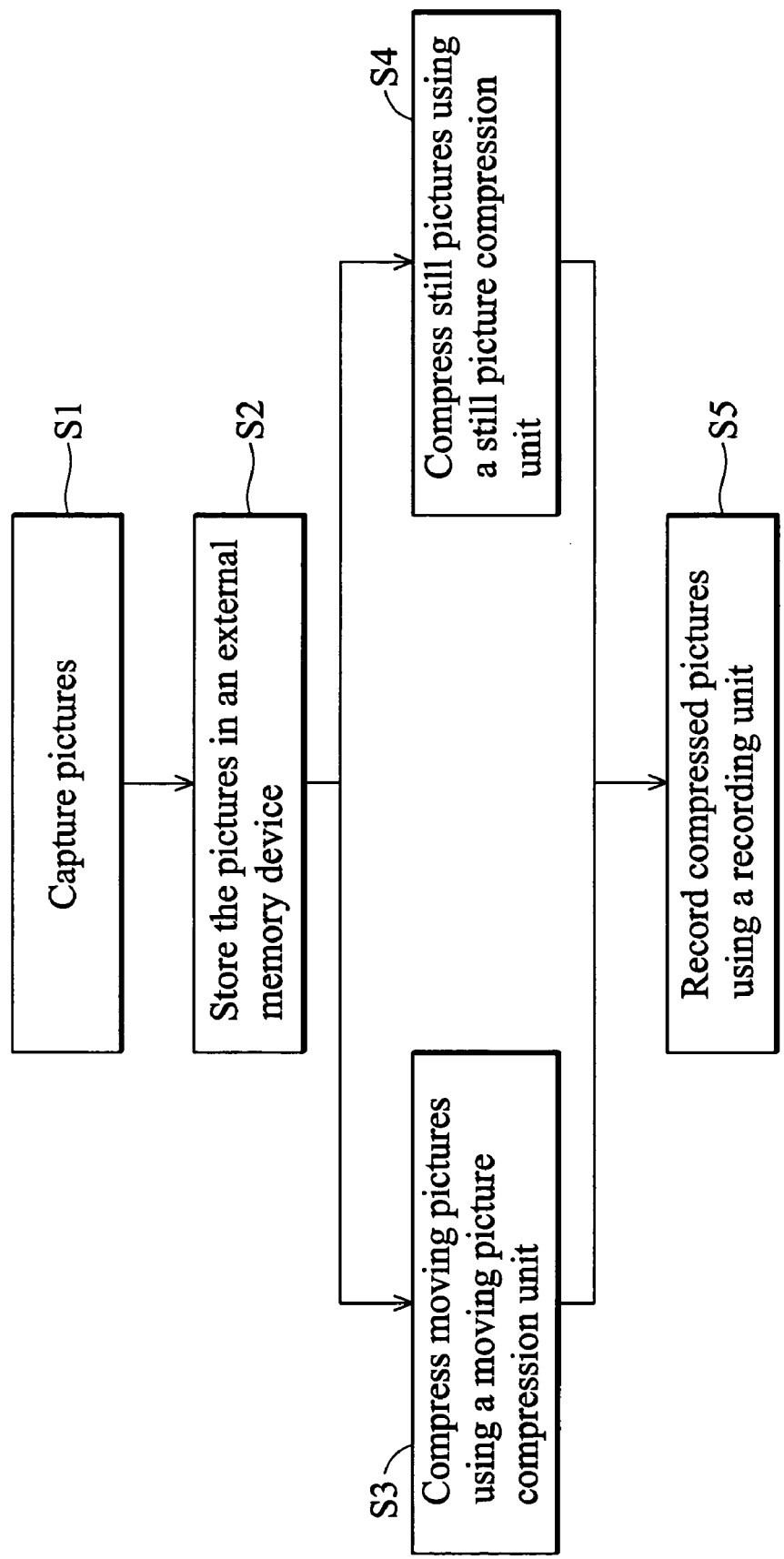
FIG. 7 is a flowchart of an embodiment of an image processing method.

FIG. 7 is a flowchart of an embodiment of an image processing method with hardware sharing for MPEG and JPEG frames.

Pictures are captured (step S1) and stored in a memory (step S2). Next, when the pictures are acquired for storing in a video format, a moving picture compression unit retrieves the pictures from the memory for picture compression (step S3), and a recording unit records the compressed moving pictures (step S5). When the pictures are acquired for storing in a photo format, a still picture compression unit retrieves the pictures from the memory for picture compression (step S4), and the recording unit records the compressed still pictures (step S5). The memory may be an external memory.

Embodiments of the image processing apparatus as described in the invention can simultaneously encode successive video frames into MPEG or DV format and still images into JPEG format. The MPEG and JPEG encoders compress source frames from the same frame buffer, and in some embodiments, the block buffer is also shared among the two encoder. The image processing apparatuses capable of recording video and capturing photo can reduce memory size required by sharing the frame buffer. Since both compression methods are block based, a block buffer is placed between a frame buffer and the compression units. When both compression units are activated, the compression units encode the same block(s) at the same time.

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the term "couple" or "couples" is intended to mean either an indirect or direct electrical connection. Thus, if a first device couples to a second device, that connection may be through a direct electrical connection, or through an indirect electrical connection via other devices and connections.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. An image processing apparatus, comprising:
    an image input device, capturing pictures;
    an external memory, coupled to the image input device, storing the pictures;
    an encoder, compressing the pictures retrieved from the external memory, further comprising:
        a moving picture compression unit, capable of compressing the pictures into compressed moving pictures;
        a still picture compression unit, capable of compressing the pictures into compressed still pictures; and
        a recording unit, coupled to the moving picture compression unit and the still picture compression unit, recording the compressed pictures;
    a first image signal processor coupled to the image input device and the external memory, applying signal processing to pictures before compression;
    a buffer coupled to the external memory, storing data required for the moving and still picture compression units during compression; and
    a second image signal processor coupled to the buffer and the still picture compression unit, applying special photo effects to the data retrieved from the buffer;
    wherein, when the pictures captured by the image input device require both moving and still picture compression, the encoder compresses the pictures simultaneously, and
    wherein the first image signal processor applies signal processing for both compressed moving and still pictures, and the second image signal processor applies signal processing for only the compressed still pictures.

2. The image processing apparatus as claimed in claim 1, wherein the first image signal processor performs at least one of scaling, noise reduction, red eye reduction, color transformation, and white balance, sharpness signal processing.

3. The image processing apparatus as claimed in claim 1, wherein the external memory stores one or multiple picture frames.

4. The image processing apparatus as claimed in claim 1, wherein the moving picture compression unit is an MPEG compression unit.

5. The image processing apparatus as claimed in claim 1, wherein the said still picture compression unit is a JPEG compression unit.

6. The image processing apparatus as claimed in claim 1, wherein the recording unit records the compressed pictures to a hard disk, an external plugged memory card, DVD, or other types of optical discs.

* * * * *